United States Patent [19]

Garner et al.

[11] Patent Number: 4,668,173

[45] Date of Patent: May 26, 1987

[54] APPARATUS FOR INSULATING ELECTRICAL CONDUCTOR

[75] Inventors: John N. Garner; Gordon D. Baxter, both of Kingston, Canada

[73] Assignee: Northern Telecom Limited, Montreal, Canada

[21] Appl. No.: 710,350

[22] Filed: Mar. 11, 1985

[51] Int. Cl.⁴ .......................................... B29C 47/02
[52] U.S. Cl. .................... 425/113; 264/174; 425/381; 425/466
[58] Field of Search ............... 425/113, 114, 110, 380, 425/381, 466, 467, 131.1; 264/174; 72/268, 269

[56] References Cited

U.S. PATENT DOCUMENTS

| 4,003,689 | 1/1977 | Hrrison et al. | 425/381 |
| 4,150,929 | 4/1979 | Brandt | 425/114 |
| 4,281,980 | 8/1981 | Hoagland et al. | 425/381 |
| 4,303,734 | 12/1981 | Sullivan | 425/381 |
| 4,305,900 | 12/1981 | Cavalli | 425/114 |

FOREIGN PATENT DOCUMENTS 1231419 12/1966 Fed. Rep. of Germany ...... 425/113
38-1480 2/1963 Japan .................................... 425/113
373176 12/1963 Switzerland ........................ 425/113

OTHER PUBLICATIONS

P. L. Josoff, W. F. Stratbucker, Technical Digest No. 33, "Adjustable Core Tube Assembly having a Compressible Seat Member", Jan. 1974, pp. 33 and 34.

Primary Examiner—Jay H. Woo
Assistant Examiner—J. Fortenberry
Attorney, Agent, or Firm—R. J. Austin

[57] ABSTRACT

Apparatus for forming an insulation layer around an electrical conductor comprising an extruder head and a die insert within the head, the insert having a feedpath for the conductor towards the die orifice. An insert holder is provided and the insert is pivotally movable within the insert by the use of a flexible mounting means which allows for movement of the insert about any plane. The mounting means may be a flange with an annular weakened section to provide the flexibility. Alternatively, the mounting means comprises spring steel annular tubes disposed between the insert and holder.

8 Claims, 6 Drawing Figures

APPARATUS FOR INSULATING ELECTRICAL CONDUCTOR

This invention relates to the insulating of electrical conductors.

In the provision of an insulating layer upon an electrical conductor wire (referred to herein as "electrical conductor"), it is conventional practice to feed the conductor through an extruder orifice while surrounding it with elastomeric extrudate which after cooling forms a dielectric material.

A problem with coating a conductor in this manner is that it is extremely difficult to locate and to hold the conductor concentrically disposed within the extrudate during the coating procedure. Known conductor position adjustment apparatus is not sufficiently sensitive in operation to provide a substantially continuous concentricity of conductor and extrudate, particularly as in the case of conductor insulation, the insulation is extremely thin, e.g. around 7 microns for 22 to 24 AWG conductor. This thickness allows for a tolerance only of the order of 0.0001 inches.

In the manufacture of cable cores, various means are known for providing substantial concentricity of a core within a jacket material during extrusion. In such apparatus, it is known to pass the core through a die insert at a die orifice. To provide substantial concentricity, die inserts are movable laterally of their die orifices so as to move their cores radially for adjustment purposes. Apparatus operating in this manner is described in a copending U.S. patent application Ser. No. 619,043, filed June 11, 1984 now U.S. Pat. No. 4,551,087 (Canadian equivalent No. 455,949 filed June 6, 1984), entitled "EXTRUSION APPARATUS" in the names of A. Pan and K. S. Cohrs. Such apparatus is suitable for providing substantial concentricity of a core within a jacket, because the tolerance for the location of the core within the jacket may be of the order of 0.005 inches for a thickness of around 40 mil. However, the differences in diameter between the jacket and a conductor insulation layer is such that the apparatus referred to in the copending application while being suitable for providing concentricity of a core, is too coarse in operation for controlling concentricity of a conductor within a relatively small thickness insulation layer and could not provide sufficiently fine degrees of movement for this type of operation.

The present invention is concerned with apparatus for forming an insulation layer upon an electrical conductor in the use of which substantial concentricity of the conductor within the layer is achieved.

According to the invention there is provided an apparatus for forming an insulation layer around an electrical conductor comprising an extruder head having a die orifice and die insert holding means, a die insert having an outlet orifice for passage of the conductor along a feedpath towards the die orifice, and a resiliently flexible mounting means providing a sole support for the die insert within the holding means, the resiliently flexible mounting means located between the insert and the holding means to allow for pivotal movement of the insert relative to the holding means and about a pivotal position located axially within the confines of the mounting means, and to controllably position the insert within the holder by flexing of the flexible mounting means.

In a preferred arrangement the flexible mounting means comprises a flange extending outwardly from the insert. This flange may be integrally formed with the insert or secured thereto. It is also secured at an outer region to the holder while being provided with a flexible section disposed between said outer region and the insert and which is thinner than said outer region in a direction parallel to the feedpath. Thus the flexible section renders the mounting means flexible. In a preferred arrangement the mounting means is an annular flange which is held around an annular outer region to the holder and the flexible section is also annular and concentrically surrounds a guide tube of the insert.

In an alternative arrangement, the flexible mounting means comprises a plurality of resiliently flexible tubes which are disposed between the insert and the holder so as to flexibly deform to accommodate movement of the insert within the holder.

Embodiments of the invention will now be described, by way of example, with reference to the accompanying drawings in which.

Figure 1:
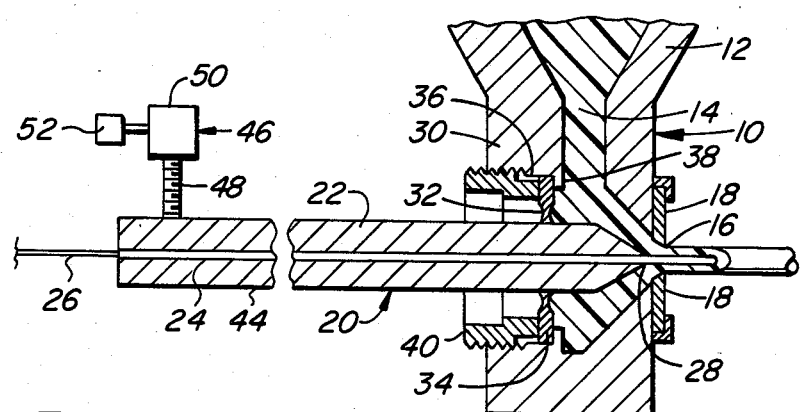
FIG. 1 is a cross-sectional view through an extruder head according to a first embodiment.
Figure 2:
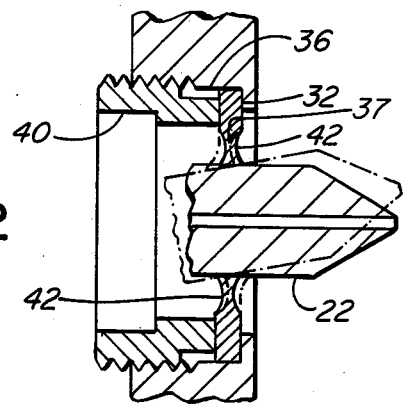
FIG. 2 is a view similar to FIG. 1 showing controlled movement of a die insert by movement of a flexible mounting means, the die insert being on a larger scale than FIG. 1.

As shown in FIGS. 1 and 2, in a first embodiment, apparatus for providing an insulation layer around an electrical conductor comprises an extruder head 10 secured in conventional fashion to an extruder 12. The extruder head is formed with flow passages 14 for connecting the extruder with a die orifice 16 formed by die plates 18 attached to the outside of the head in conventional fashion. Mounted within the extruder head is a die insert 20. As shown by FIG. 1, the insert comprises a core tube 22 having a passage 24 for movement of a conductor 26 along a feedpath through the passage and out through an outlet orifice 28 of the core tube for directing the conductor through the die orifice 16.

The die insert is mounted within an insert holding means 30 of the head by means of a flexible mounting means 32. The flexible mounting means comprises a high spring steel annular flange which surrounds the core tube 22 and is secured to it. An annular outer region 34 of the flange is a tight fit around its outer periphery against a bore surface 36 of the extruder head. The region 34 is held firmly against an abutment shoulder 38 by means of a securing nut 40 which is in engagement with a screw threaded portion of the bore 36 as shown in FIGS. 1 and 2. An annular section 37 of the flange is thinner when taken in a direction parallel to the feedpath of the conductor than the outer regions 34. This reduction in thickness is provided by two axially opposing grooves 42 in the radial surfaces of the flange, these grooves having bases of part circular shape, as shown, so that the thinner section firstly reduces progressively in thickness from the core tube in a radially outwards direction and then increases in thickness towards that of the outer region 34. Thus the weakened annular section 37 of the flange is produced about which the core tube is flexible thereby allowing pivotal movement of the core tube about the thinner section. The shape of the thinner or flexible section 37 is such that no undue stresses will be involved during any flexing procedure so that stress cracking of the flange is avoided. In this particular embodiment, the region 34 has an axial thickness of approximately 0.25 inches whereas the weakened section between grooves 42 is about 0.125 inches at its thinnest part.

As shown by FIG. 2, the core tube 22 may be pivoted about an axial location in any pivotal plane by flexure of the thinner or flexible section 36 of the flange. One such pivotal position is shown exaggerated in chain dotted outline in FIG. 2. To enable the core tube to be moved in this way, it is formed with a rearward or upstream extension 44 along the feedpath of the conductor, and a core tube moving means 46 is provided at an upstream end of this extension. In FIG. 1 is shown one such core tube moving means 46 which lies in the plane of the section of FIG. 1. However, the apparatus is also provided with similarly constructed moving means 46 (not shown), and which lie at the same or adjacent axial position of the core tube, but in planes different from the section of that figure. These moving means are not shown in the sketch for reasons of simplicity. Each moving means 46 may be any type of device which will move the core tube in a particular direction controlled by that moving means. As shown, each moving means 46 comprises a screw jack device having a screw threaded shaft 48 which is movable axially of itself through gearing located within a gear box 50. Movement of the gearing is controlled by an electrical motor 52 which may be a stepping motor.

Figure 3:
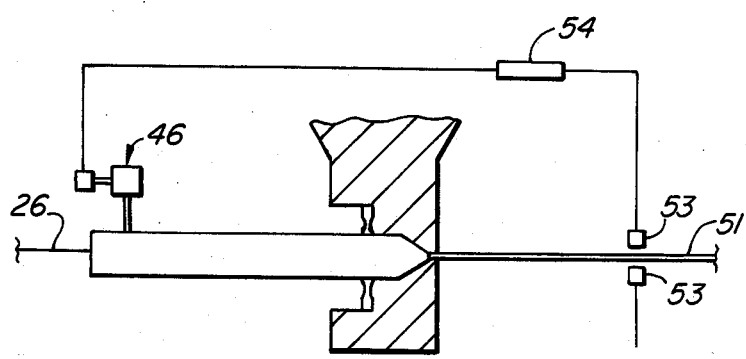
FIG. 3 is a diagrammatic side elevational view, on a smaller scale than FIG. 1, showing the extended head with a position control for the die insert.

In use of the apparatus shown in FIGS. 1 and 2, the extruder head is disposed in a production line for providing insulation upon conductor to produce an insulated conductor 51, as shown in FIG. 3. The insulated conductor moves downstream from the extruder head and passes through a device 53 which is positioned to measure the thickness of the insulation at different parts around the conductor or otherwise to gauge the eccentricity of the conductor within the insulation. This device may be of a conventional laser beam type or beta ray type and is capable of sending signals relating to the insulation thickness at particular positions, or relating to the eccentricity as the case may be to a computer control 54. In the computer control the signals received from the device 53 are compared with a preset value which corresponds to the desired concentricity of the conductor inside the insulation. If the measured values or signals as sent to the computer differ from the preset value, then the computer issues a control signal to the appropriate moving means 46 to move the core tube laterally in the appropriate direction so as to move the conductor as it issues from the die orifice towards a more concentric position within the insulation. As can be seen, the movement of the core tube is a simple operation which takes place by flexing of the weakened section 37 of the annulus in the manner described above and with reference to FIG. 2.

The construction of the embodiments described above is relatively simple and is capable of providing fine adjustment to the outlet orifice 28 of the core tube. Hence the conductor may be repositioned with regard to the die orifice by sufficiently small amounts relative to the thickness of insulation to enable the apparatus to be of practical use for controlling concentricity of the conductor within the insulation although such insulation need only be of the order of 7 microns or less in thickness.

Apart from the fact that the construction according to the invention and as shown in the embodiment provides a sufficiently fine control for centralizing conductor within a layer of insulation, it may be placed sufficiently firmly in position within the extruder head while avoiding the necessity, during assembly, of attempting to center the core tube accurately for centralization purposes as is the case in a conventional arrangement. A further advantage is that while the core tube is pivotally movable, there are no gaps or interstices through which extrudate may leak from the passage 14 and upstream of the extruder head.

The above embodiment is useful for extruding a polymeric material around a conductor as insulation as has been described. However, certain polymeric materials show a tendency to deteriorate under certain pressure and heat conditions within an extruder. Such a material is polyvinylchloride which, during deterioration, may foul moving surfaces of apparatus such as to render them unworkable until cleaning has been effected.

Figure 4:
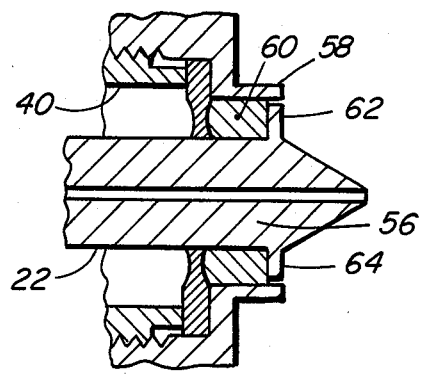
FIG. 4 is a view similar to FIG. 1 of a modification of the first embodiment.

Bearing the above in mind, FIG. 4 shows a modification of the first embodiment in which polyvinylchloride is the material which is to be extruded as insulation. In FIG. 4, a downstream end 56 of the core tube is shrouded by a cylindrical extension 58 of the extruder head. A wide annular grooved section 60 of the core tube lying within the extension 58 is filled with a compressible and resilient packing material 62 which does not unduly resist movement of the insert during the alignment process with the die orifice. A flange 64 formed by the groove has sufficient clearance from the cylindrical extension 58 to allow for movement of the core insert and also holds the packing in place.

Figure 5:
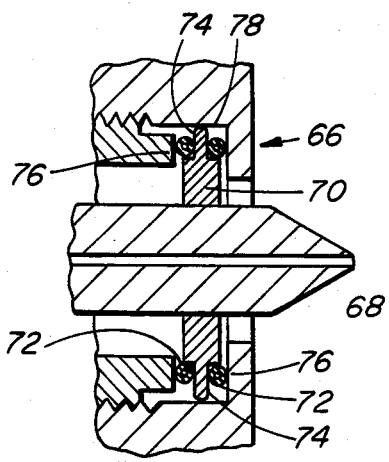
FIG. 5 is a view similar to FIG. 1 of a second embodiment.

In a second embodiment as shown in FIG. 5, apparatus 66 is of a construction similar to that described with reference to FIG. 1 except for the design of the die insert and its flexible mounting means. As shown, the die insert 68 has an annular flange 70 of constant width in cross-section to its outer periphery. Hence the flange does not have the weakened section as described in the first embodiment. In the second embodiment, the flexible mounting means is separate from the die insert itself. The flexible mounting means comprises a plurality of spring steel annular tubes 72 surrounding the periphery of the annular flange 70. In this embodiment there are in fact two tubes 72 which are separated by a short annular peripheral flange 74 on the flange 70. The two springs are held in position by abutments 76 at the axial sides of the assembly. The short annular flange 74 has a slightly radiused or chamfered outer edge and lies sufficiently closely to an annular surface 78 of the extruder head so as to allow for pivotal movement of the insert while avoiding any clearance such as would allow for any radial movement.

In use of the apparatus of FIG. 5, pivotal movement of the insert caused by the moving means 46 is accompanied by tilting of the flange 70 thereby compressing one spring steel tube in a radial direction around certain parts of its structure whereas pressure is removed from diametrically opposite parts. At the same time the other tube is radially compressed at positions diametrically opposite from the compression applied to the first-mentioned tube. Upon change in the position of the die insert to realign it with the die orifice, strained parts of the spring steel tubes tend to return to their normal unstressed state.

Figure 6:
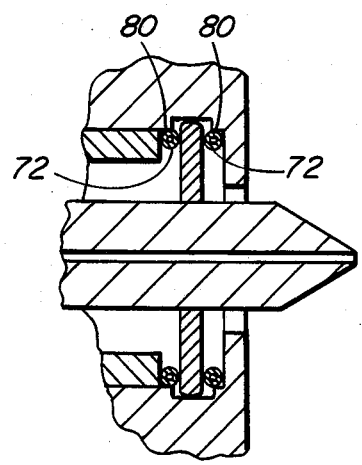
FIG. 6 is a cross-sectional view of part of an apparatus showing a modification of the second embodiment.

In a modification of the second embodiment as shown in FIG. 6, the two tubes 72 are disposed at the sides of the flange 70 and are contained by corner abutments 78 of the extruder head.

We claim:

1. Apparatus for forming an insulation layer around an electrical conductor comprising an extruder head having a die orifice and die insert holding means, a die insert having an outlet orifice for passage of the conductor along a feedpath towards the die orifice, and a resiliently flexible mounting means providing a sole support for the die insert within the holding means, the resiliently flexible mounting means located between the insert and the holding means to allow for pivotal movement of the insert relative to the holding means in a plurality of planes having a common line of intersection extending along the feedpath and about a pivotal position located axially within the confines of the mounting means, and means to controllably position the insert within the holder by flexing of the mounting means.

2. Apparatus according to claim 1 wherein the die insert comprises a core tube and the flexible mounting means comprises a flange extending outwardly from the core tube, the flange secured at an outer region to the holding means and having a flexible section disposed between said outer region and the core tube and which is thinner than said outer region in a direction parallel to the feedpath to render the mounting means flexible about said flexible section.

3. Apparatus according to claim 2 wherein at said flexible section, the flange firstly decreases progressively in thickness as it moves away from the core tube and then increases progressively in thickness as it moves further from the core tube.

4. Apparatus according to claim 3 wherein the flexible section is provided by two grooves aligned axially at opposite sides of the flange, each groove being formed with a base of arcuate cross-section.

5. Apparatus according to claim 4 wherein the flange is annular and extends completely around the core tube with the flexible section also being annular.

6. Apparatus according to claim 1 wherein the flexible mounting means comprises resiliently flexible annular means mounted between the die insert and the holder.

7. Apparatus according to claim 6 wherein the resiliently flexible means comprises a plurality of spring steel annular tubes disposed between and separating the insert and the holder.

8. Apparatus according to claim 7 wherein the spring steel annular tubes are located around an outer peripheral surface of a flange of the die insert.

* * * * *